(No Model.) 2 Sheets—Sheet 2.
I. GOOD.
GATE.
No. 388,857. Patented Sept. 4, 1888.
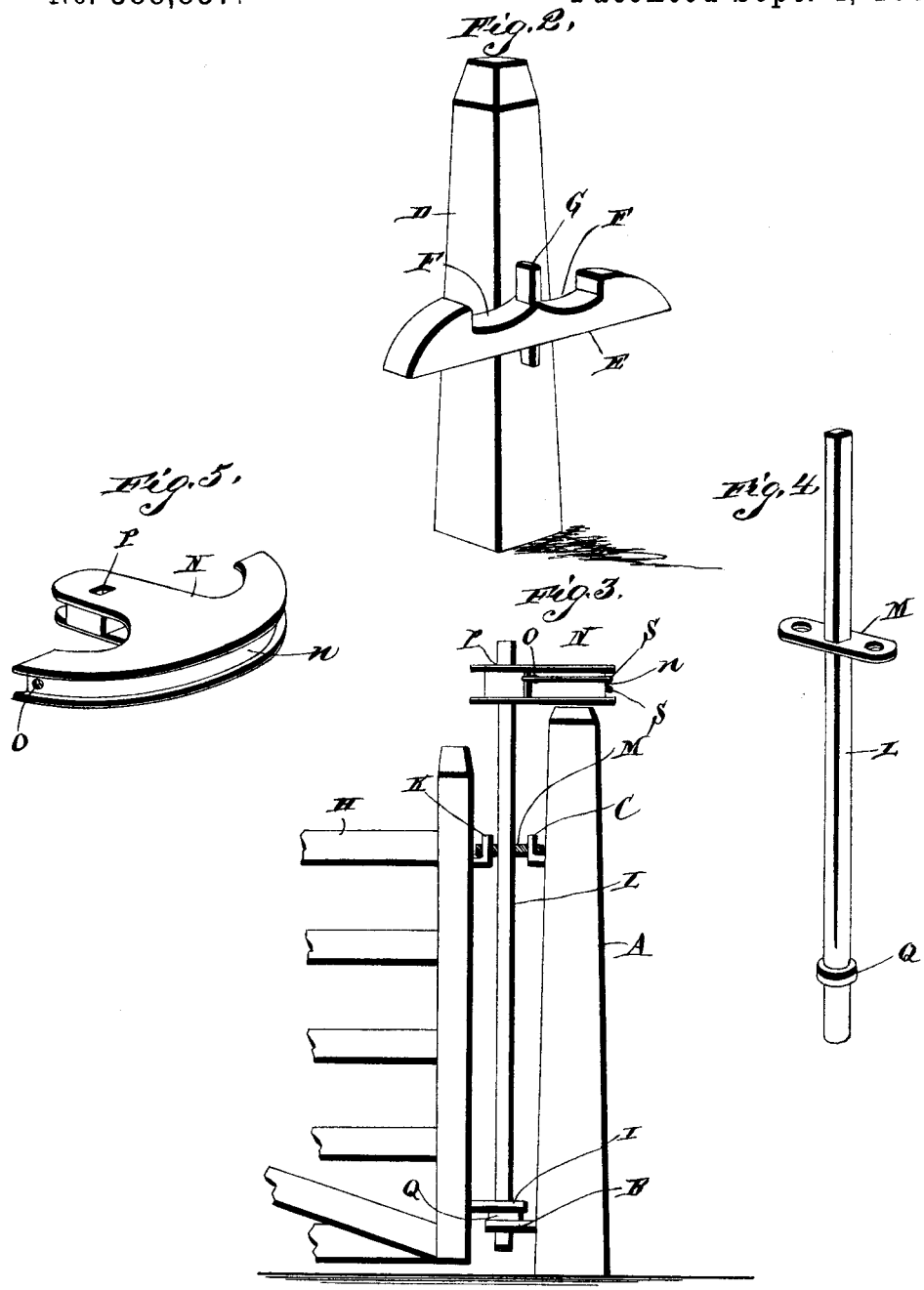
Witnesses
Inventor,
Isaac Good,
By his Attorneys

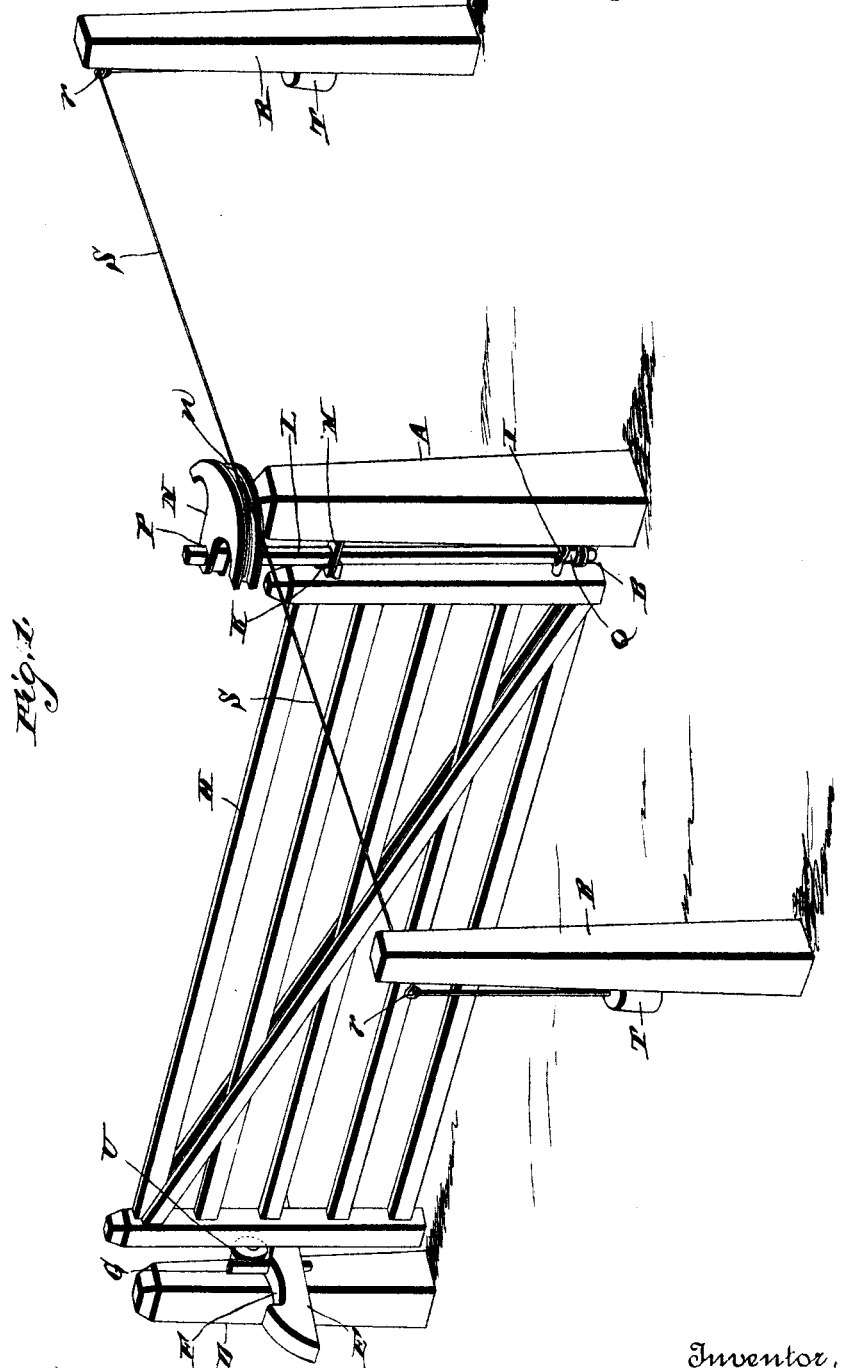

UNITED STATES PATENT OFFICE.

ISAAC GOOD, OF FARMERSVILLE, PENNSYLVANIA.

GATE.

SPECIFICATION forming part of Letters Patent No. 388,857, dated September 4, 1888.

Application filed May 2, 1888. Serial No. 272,591. (No model.)

*To all whom it may concern:*

Be it known that I, ISAAC GOOD, a citizen of the United States, residing at Farmersville, in the county of Lancaster and State of Pennsylvania, have invented a new and useful Improvement in Gates, of which the following is a specification.

My invention relates to improvements in gates, with especial reference to that class of gates which are adapted to be operated by the driver of a vehicle without leaving his seat; and it has for its object to provide simple, cheap, durable, easily-constructed and reliable means for operating the gate.

The invention consists in a certain novel construction and arrangement of devices, fully set forth hereinafter in connection with the accompanying drawings, wherein—

Figure 1 is a perspective view of the gate. Fig. 2 is a detail perspective view of the latch-post. Fig. 3 is a side view, partly in section, of the hinged end of the gate, to show the construction of the parts. Fig. 4 is a detail view of the vertical shaft; and Fig. 5 is a similar view of the segmental head, which is attached to the upper end of the shaft.

Referring to the drawings, A designates the hinge-post, having a bearing or eye, B, near the bottom, and a staple or hook, C, near the upper end, and D designates the latch-post, which is provided with the horizontal latch-bar E, having notches or sockets F F therein. A vertical stud or stop, G, is arranged between the said notches or sockets, for a purpose to be explained.

The gate H is provided at its rear end, near the bottom, with the bearing or eye I, adapted to be aligned with the bearing or eye B, and near the top with the staple or hook K, similar to the staple or hook C and at the same height.

A vertical shaft, L, is mounted at its lower end in the aligned bearings or eyes B I, and is provided with the link M, having bearings in its ends to receive the hooks or staples C and K, and a segmental or semicircular disk or head, N, is attached to the upper end of the shaft. This head is provided on its curved side or edge with a groove, *n*, at the ends of which are formed the eyes or apertures O O, for a purpose to be explained, and a vertical aperture, P, is formed in the head to receive the upper square end of the shaft. The shaft is provided near its lower end, between the eyes or bearings B I, with a rigid collar, Q, which thus separates the said eyes or bearings.

Vertical posts R R are arranged on opposite sides of the gate, having guide-eyes *r r* thereon, and S S represent operating-cords which operate in the guide-eyes *r*, and are attached at their ends in the eyes or apertures O, after passing through the groove *n*. The free depending ends of the cords are provided with weights T, which are of equal weight, and will counterbalance each other and hold the disk or head in any position.

The free end of the gate is provided with a roller, U, which is adapted to pass up the beveled ends of the latch-bar and engage in one of the notches or sockets in the bar.

The operation of the gate is as follows: As the vehicle approaches the gate, the driver draws down on the end of the cord, thereby turning the disk or head and the shaft attached thereto. The link is thus swung laterally at its front end, and the rear end of the gate is inclined away from the vehicle, and the inclination of the rear end of the gate raises the roller out of the socket or notch in the latch-bar (even if it is engaged in the socket or notch on the rear side of the stud or stop) and allows the gate to swing away from the vehicle. After passing through the gate it is closed by drawing the other end of the operating-cord, the roller on the free end of the gate striking against the stud or stop and dropping into the socket or notch. The roller enables the free end of the gate to be more readily latched, as it passes more easily over the beveled ends of the latch-bar.

The portion of the vertical shaft between the link and the bearings or eyes may be dispensed with, and the said bearings or eyes may be connected by an ordinary pin or bolt; but I prefer the construction which is herein-described and shown, for the reason that the gate may be dismounted and remounted more easily, and when mounted the weight of the gate locks the operating means in position.

It will be observed that the construction of the gate and its attachments are simple, and the operating mechanism is not immovably connected to either the gate or the post, and therefore the said operating mechanism may be attached to any ordinary gate now in use, and the gate shown in the drawings may be hung directly on the post in the ordinary manner by simply interchanging the eye and hook on the gate.

Having thus described my invention, what I claim, and desire to secure by Letters Patent of the United States, is—

1. The combination, with a post having an eye, B, at its bottom and the gate having an eye, I, at its bottom, registering with the eye B, of the link M, connecting the top of the gate to the post, the vertical shaft rigidly secured to the center of the link and passing through the said registering eyes B and I, with a collar, Q, between the same, the head attached to the said shaft, and operating-cords connected to the head, substantially as specified.

2. The combination, with the post, the gate hinged at its bottom to the post, and the link pivoted at its opposite ends to the gate and the post, of the shaft rigidly attached to the center of the link, the segmental disk or head mounted on the upper end of the shaft and having a groove in its curved edge, and the operating-cords attached, substantially as described, to the disk or head and extending on opposite sides of the gate, substantially as specified.

3. The combination, with the post, the gate, and the link connecting the top of the gate to the post and having a vertical shaft attached thereto, of the head attached to the shaft and unconnected with the post, the operating-cords attached to the head and passing through suitable guide-eyes on posts arranged on opposite sides of the gate, and the weights on the ends of the cords adapted to hold the head in the desired position, substantially as and for the purpose specified.

In testimony that I claim the foregoing as my own I have hereto affixed my signature in presence of two witnesses.

ISAAC GOOD.

Witnesses:
  JOHN W. APPEL,
  ISAAC SHIRK.